(12) United States Patent
Kopko

(10) Patent No.: US 6,286,326 B1
(45) Date of Patent: Sep. 11, 2001

(54) CONTROL SYSTEM FOR A REFRIGERATOR WITH TWO EVAPORATING TEMPERATURES

(75) Inventor: William Leslie Kopko, Springfield, VA (US)

(73) Assignee: WorkSmart Energy Enterprises, Inc., Washington, DC (US)

( * ) Notice: Subject to any disclaimer, the term of this patent is extended or adjusted under 35 U.S.C. 154(b) by 0 days.

(21) Appl. No.: 09/318,937

(22) Filed: May 26, 1999

Related U.S. Application Data
(60) Provisional application No. 60/086,757, filed on May 27, 1998.

(51) Int. Cl.[7] .............................. F25D 17/00; F25B 1/00
(52) U.S. Cl. ............................. 62/179; 62/228.4; 62/526
(58) Field of Search ..................... 62/179, 180, 228.4, 62/228.5, 203, 229, 186, 526

(56) References Cited

U.S. PATENT DOCUMENTS

| | | | |
|---|---|---|---|
| 4,416,119 | * | 11/1983 | Wilson ................................. 62/149 |
| 4,481,787 | * | 11/1984 | Lynch .................................. 62/180 |
| 5,715,693 | * | 2/1998 | Van Der Walt et al. ............. 62/198 |
| 5,720,180 | * | 2/1998 | Suh ..................................... 62/179 |
| 5,722,248 | * | 3/1998 | Suh ..................................... 62/180 |
| 5,771,701 | * | 6/1998 | Suh ..................................... 62/179 |
| 5,867,994 | * | 2/1999 | Kopko .................................. 62/82 |
| 5,931,004 | * | 8/1999 | Yoo et al. ............................. 62/82 |

* cited by examiner

Primary Examiner—William Wayner
(74) Attorney, Agent, or Firm—Rothwell, Figg, Ernst & Manbeck PC

(57) ABSTRACT

An improved refrigerator that combines means for directing cooling to a fresh-food compartment and a freezer compartment with a variable-capacity compressor. During fresh-food cooling the compressor volumetric capacity is reduced to match capacity of the expansion device. The means for directing cooling may be a multiple evaporators. Another option is a single evaporator with a reversing fan and flaps that respond to the direction of air flow to direct air flow between the evaporator and each compartment. Another embodiment comprises a natural-convection evaporator with dampers for directing air flow. This last embodiment also allows automatic defrost with a natural-convection evaporator.

15 Claims, 5 Drawing Sheets

CONTROL SYSTEM FOR A REFRIGERATOR WITH TWO EVAPORATING TEMPERATURES

The applicant claims benefit of U.S. provisional patent application 60/086,757 filed on May 27, 1998.

BACKGROUND

This invention is related to improving the control of a refrigerator that sequentially operates with two different evaporator temperatures.

Existing refrigerators that are now in production almost exclusively use a single evaporator to cool both the fresh-food and freezer compartments. These systems effectively use the same evaporator temperature to cool both compartments.

This is a simple approach but it results in an inherent efficiency loss. The problem is that the evaporating temperature must be low enough to cool the freezer while a much higher evaporating temperature could be possible for the fresh-food compartment. Theoretically a reduction of 20% or more in energy use is possible for the refrigerator if a higher temperature refrigerant could cool the fresh-food compartment.

There are several possible solutions that can create a second evaporating temperature. One way is to simply have a second circuit. The problem with this approach is that using two small compressors in place of a single large compressor adds a large cost and efficiency penalty.

A better approach is described in U.S. Pat. No. 5,406,805, "Tandem Refrigeration System." This system uses two forced-convection evaporators in series. This system runs only one evaporator fan at a time as a way of creating two evaporating temperatures. The sequence of operation is for the fresh-food evaporator to run first, then the freezer evaporator. Measured energy savings of 10 to 20% have been achieved.

The tandem system relies on the store of liquid refrigerant in the evaporators at start up to provide cooling to the fresh-food compartment. The problem is that a conventional capillary tube has essentially "choked" flow, which means that the mass flow rate is effectively fixed for a given condenser condition. Unfortunately the compressor mass flow increases rapidly with higher evaporating temperatures because of the higher suction gas density. Since the capillary tube has to be sized to handle the flow to the freezer, it is much too restrictive for steady-state operation at a higher evaporator temperature. This limitation means that the tandem system cannot run for more than roughly one or two minutes in cooling the fresh-food compartment without the evaporating temperature approaching that found in the freezer. This limitation also means that the fresh-food evaporator and fan need a large capacity to do all the required cooling in a very short time period.

A similar approach is described in U.S. Pat. No. 5,732,561. This patent uses a damper arrangement to direct air flow to each compartment from a single evaporator. Like the tandem system, it relies on a transient effect to cool the fresh-food compartment. This feature means that the system must first cool the fresh-food compartment, then immediately cool the freezer in order to achieve any energy savings.

An alternate evaporator configuration is described in U.S. Pat. No. 5,867,994 entitled "Dual-Service Evaporator for Refrigerators." This invention uses a reversing fan and flaps that act as check valves to control air flow to each compartment. While this approach simplifies the evaporator design, it does not address the fundamental limitations associated with the refrigeration circuit.

One related problem with these approaches is the compressor sizing. The compressor should be smaller than that for a conventional system to achieve optimum efficiency in these systems, but that limits the pulldown capability. This feature creates the need to trade off efficiency and performance.

Recent developments in compressor technology have created high-efficiency variable capacity compressors suitable for use in refrigerators. The Sunpower linear compressor is a prime example. It has a higher full-load efficiency and can modulate capacity by simply varying the input voltage to the linear motor. The projected production costs for these new compressors are comparable to that of conventional fixed-capacity compressors. Other variable-capacity compressors include those with Electronically Commutated Motors (ECM). Two-speed compressors and compressors with various unloading mechanisms are also possible and found in the prior art.

Results of tests with variable-capacity compressors have been disappointing; there is little or no efficiency improvement at lower flow. A problem with applying the new variable-capacity compressors is that existing systems are not adapted to varying refrigerant flows. The capillary tube and fans have fixed capacity. Changing to variable-speed fans and expansion valves would add a significant cost penalty to the system.

SUMMARY OF THE INVENTION

This invention uses a compressor with at least two volumetric pumping capacities in combination with a refrigerant cycle that can alternate between two evaporating temperatures. The compressor runs at a high volumetric capacity when cooling the freezer and a lower capacity when cooling the fresh-food compartment. This invention solves the mismatch between compressor pumping capacity and capillary-tube flow rate that occurs in the prior art. It also reduces the size requirement of the fan and evaporator used to cool the fresh-food compartment, which reduces first cost of the system. The result is a more-flexible, more-efficient, lower-cost system than that found in the prior art.

DESCRIPTION OF THE PREFERRED EMBODIMENTS

The invention combines a variable-capacity compressor in a refrigerator that uses two evaporating temperatures. This approach improves performance and lowers cost. The basic idea is to run the compressor at reduced capacity when it is cooling the fresh-food compartment. This approach should allow continuous operation at this condition which gives much greater flexibility to control the system. It also greatly reduces the capacity requirements of the fresh-food evaporator and should give better system efficiency.

Figure 1:
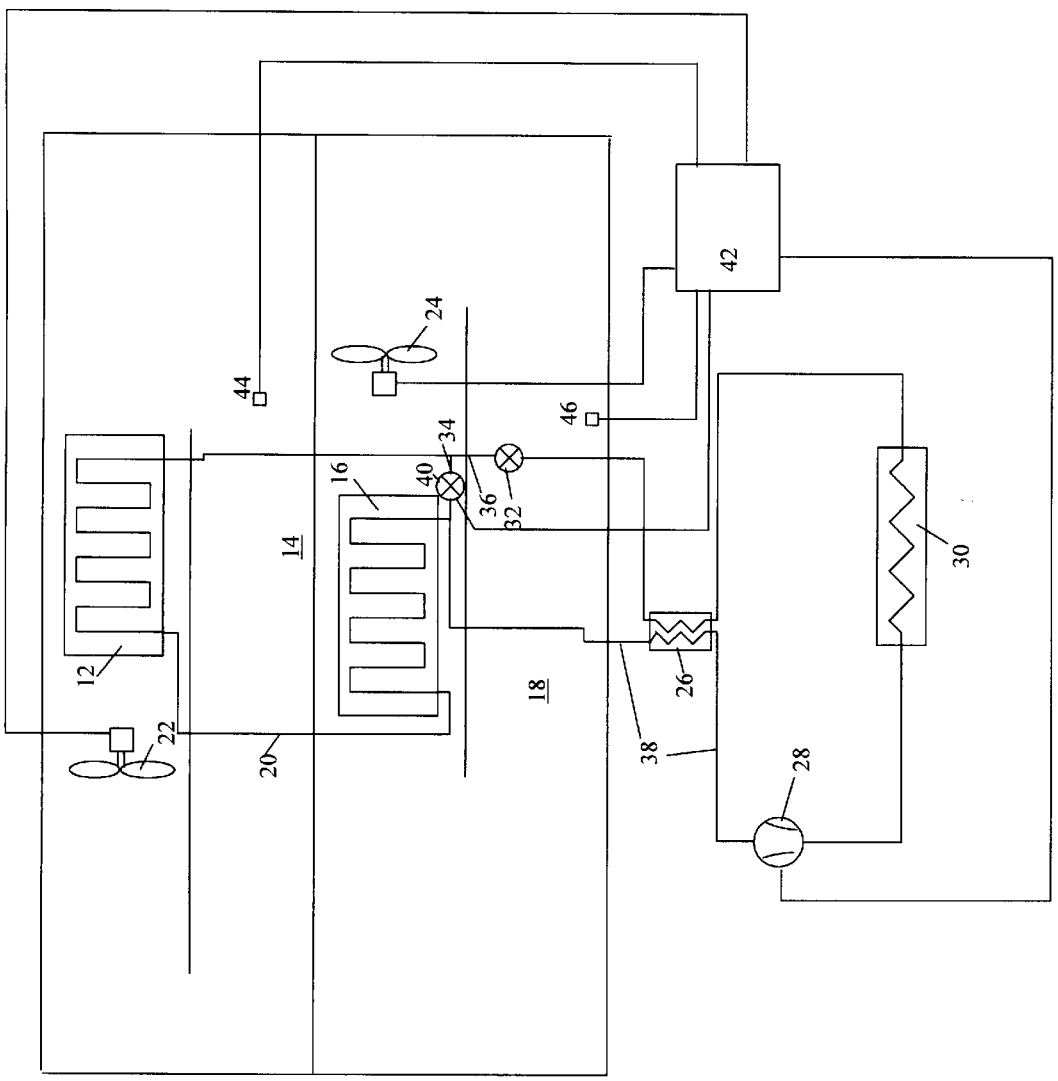
FIG. 1 shows a preferred embodiment that uses two evaporators.

FIG. 1 shows a dual-evaporator embodiment. Freezer compartment 14 is cooled by freezer evaporator 12 and associated freezer fan 22. Similarly fresh-food fan 24 circulates air over fresh-food evaporator 16 to cool fresh-food compartment 18. The refrigerant line 20 connects the outlet of the freezer evaporator to the inlet of the fresh-food evaporator so that the two are in a series flow arrangement. While the preferred arrangement is to have the freezer evaporator upstream of the fresh-food evaporator, the opposite configuration is also possible. Refrigerant suction line 38 allows refrigerant to move to through the suction-line heat exchanger 26, which warms the suction gas with warm liquid refrigerant.

The suction gas then goes into variable-capacity compressor 28. The compressor pumps the refrigerant to a higher discharge pressure. The compressor may be fixed-displacement reciprocating or rotary compressor with a variable-speed motor. Possible variable-speed motors include an ECM (electronically commutated motor), an inverter-driven AC induction motor, or a two-speed motor.

Another option is a variable-displacement compressor. Possible variable-displacement options include a variable-stroke linear compressor, tandem compressors, or a multiple-cylinder reciprocating compressor with the ability to unload cylinders. A key feature of this compressor is that it must be able to run with at least two volumetric flow rates.

After the compressor the refrigerant is cooled in condenser 30 and then suction-line heat exchanger 26. Capillary tube 32 provides a pressure drop after the suction-line heat exchanger. Refrigerant line 36 connects the outlet of the capillary tube to the inlet to the freezer evaporator. As is apparent, there is a constant flow area of refrigerant in the path between condenser 30 and evaporator 12 during both fresh food and freezer cooling modes.

An optional defrost valve 40 and associated bypass line 34 allow refrigerant to circulate by natural convection between the two evaporators. This arrangement allows heat from the fresh-food compartment to warm the freezer evaporator during defrost. The freezer evaporator should be physically located above the fresh-food evaporator to allow natural-convection defrost. Another alternative is to use a defrost heater as in conventional systems and eliminate the defrost valve and bypass line.

Controller 42 is connected to temperature sensors 44 and 46 which provide input to allow it to maintain proper temperatures in each compartment. The controller is also connected to compressor 28, defrost valve 40, and fans 24 and 26 which allows it to control the operation of the fans and the valve, and the capacity of the compressor.

The table below summarizes the operating modes for the two-evaporator system:

| Mode | Freezer Fan | Fresh-food Fan | Compressor | Optional Defrost Valve |
|---|---|---|---|---|
| fresh-food cooling | off | on | low capacity | closed |
| freezer cooling | on | off | high capacity | closed |
| defrost | off | on | off | open |
| off | off | off | off | closed |

A key change from the prior art is that the refrigerator may switch between fresh-food and freezer mode at any time without going through an off cycle. For example consider a change from cooling the freezer to cooling the fresh-food compartment. The switch is accomplished by simply turning the freezer fan off, turning fresh-food fan on, and reducing the compressor capacity. The system should quickly reach a new operating condition with a much higher evaporating pressure. The conventional tandem system does not allow efficient operation after this switch because limitations of the capillary tube would keep evaporating pressure close to the saturation pressure at the freezer temperature.

Note that this system does not normally allow simultaneous cooling in both compartments. While it would be possible to cool the fresh-food compartment at the same time as the freezer, the evaporating temperature would have to be similar to that for freezer cooling. This situation would result in relatively inefficient cooling of the fresh-food compartment. On the other hand, certain pulldown situations may call for simultaneous cooling, and this is a possible control option with two evaporators.

Figure 2:
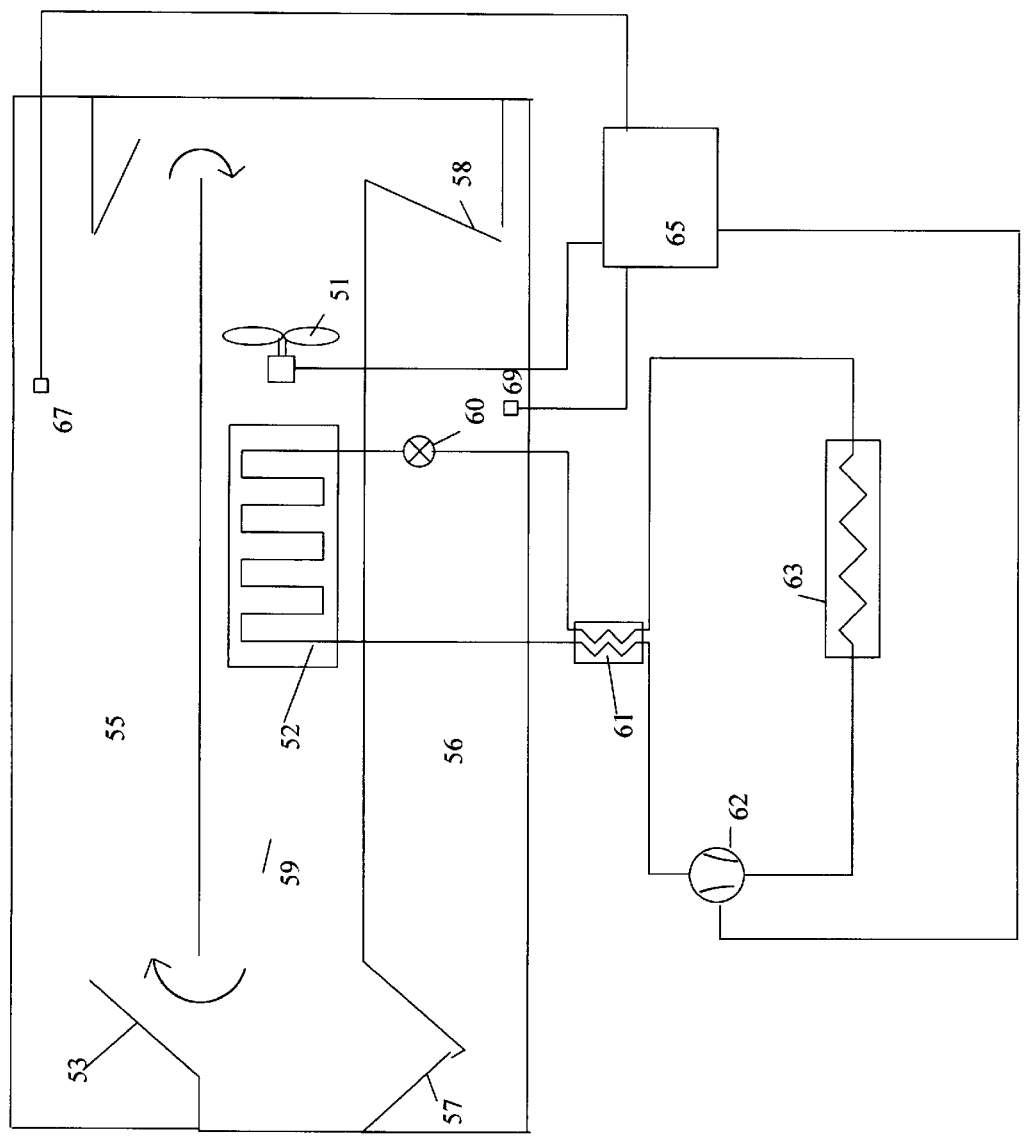
FIG. 2 shows a preferred embodiment that uses a single evaporator and a reversing fan.

FIG. 2 shows a single-evaporator embodiment of the invention. A reversing fan 51 moves air over evaporator 52 through duct 59. The reversing fan can move air to the left or right depending on its direction of rotation. Flaps 53 and 54 open and flaps 57 and 58 close when the fan blows to the left. This allows air to circulate through freezer compartment 55. When the fan blows to the right, the flaps 53 and 54 close and flaps 57 and 58 open to allow air to circulate through fresh-food compartment 56. The flaps are air valves that act as check valves to allow flow in only one direction. This arrangement allows the direction of rotation of the fan to control how air circulates through the refrigerator, which also allows control of cooling for each compartment. While this figure shows four flaps, as few as one flap for each compartment would allow the similar control but may increase air leakage between compartments.

The refrigerant circuit includes a variable-capacity compressor 62. The discharge gas from the compressor goes into condenser 63, which cools the refrigerant before it enters suction-line heat exchanger 61. The suction-line heat exchanger further cools the refrigerant liquid before it enters capillary tube 60. The capillary tube creates a refrigerant pressure drop which lowers the refrigerant pressure and temperature before it enters evaporator 52. The refrigerant leaving the evaporator is warmed in suction-line heat exchanger 61 and returns to the suction side of compressor 62.

One option is to use warm liquid refrigerant to heat the surfaces that contact the flaps to prevent frost or moisture accumulation that may interfere with operation of the flaps. This warm liquid may be draw from the outlet of the condenser or elsewhere on the line between the condenser and the capillary tube.

Controller 65 adjusts the speed of the compressor and controls the operation of the evaporator fan to maintain proper temperatures in each compartment. Fresh-food temperature sensor 69 and freezer temperature sensor 67 provide input to the controller.

The table below describes the operating modes for the single-evaporator embodiment.

| Mode | Fan Run | Fan Flow Direction | Compressor |
| --- | --- | --- | --- |
| fresh-food cooling | on | right | low capacity |
| freezer cooling | on | left | high capacity |
| defrost | on | right | off |
| off | off | off | off |

This system requires that only one compartment receives cooling at a time. In cases where both compartments are calling for cooling, a simple solution is to give the freezer priority. Another possibility is to allow the compartment that calls for cooling first to continue to receive cooling. Other more sophisticated options are also possible.

As far as the optimum compressor capacity, a reasonable approximation is to keep the mass flow rate through the compressor approximately constant for the two operating modes. Since the compressors are normally positive-displacement machines, the mass flow rate for a fixed-capacity compressor would increase in proportion to the density of the suction gasses. For typical evaporating temperatures (−10° F. freezer and +25° F. in the fresh-food compartment) the gas density is roughly twice as high at the higher evaporator pressure. This means that the compressor volumetric capacity should be reduced by approximately 50% in fresh-food mode compared to its capacity in freezer mode. The optimum figures can be determined experimentally to optimize efficiency in each operating mode.

The optimum compressor capacity should also depend on condenser conditions. The control system may reduce the compressor capacity at lower condensing pressures to better match compressor flow to capillary flow rate. These effects are normally relatively minor and are not necessary for typical applications.

While the capillary tube does limit operation, the system can accommodate a fairly large variation in compressor volumetric flow rate (roughly +/−20% of optimum) without a major performance penalty. This flexibility should allow the compressor to modulate over a limited range of capacities, which can improve temperature control and reduce cycling losses.

The optimum fan control at start up and at the transition between freezer and fresh-food cooling modes may include a short time delay. For example, it may be more efficient to stop the fan for a few seconds after turning the compressor on or increasing the compressor capacity from that for fresh-food mode to that for freezer mode. This delay would allow the evaporator temperature to fall below that of the freezer and prevent adding heat to the freezer during the transition. Similarly it may be desirable to allow the fan to continue to operate for a few seconds to cool the freezer after the compressor turns off.

These control strategies can be implemented using a variety of different hardware. Simple electromechanical thermostats and relays can provide adequate control. More sophisticated electronic controls are also possible.

While above description is for systems with two evaporating temperatures, three or more temperatures are also possible and would operate in a similar manner. The multiple-evaporator configuration can theoretically handle any number of evaporating temperatures. The single-evaporator configuration may require active damper control or additional fans to provide adequate control. These systems would add complexity and cost and would not normally be used in standard refrigerators, but may be desirable for special applications.

Figure 3:
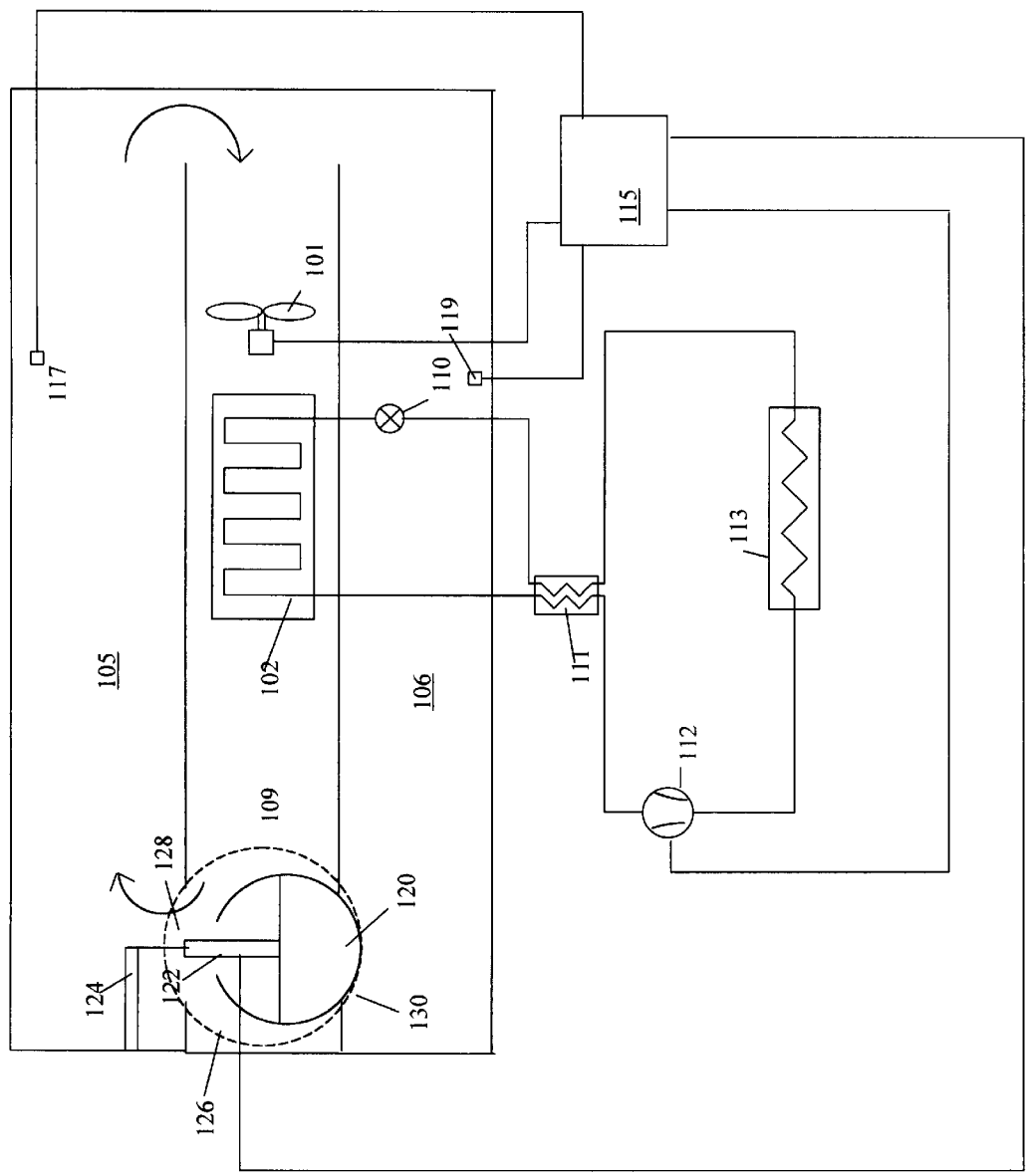
FIG. 3 shows an alternate embodiment with a single evaporator that uses a damper for directing air flow from an evaporator fan.

FIG. 3 shows an alternate embodiment that uses as single evaporator with a damper that acts as a three-way valve to direct air from the evaporator to each compartment. As with the previous embodiment, a fan 101 moves air over an evaporator 102 through channel 109. The evaporator is part of a refrigerant circuit formed by suction line heat exchanger 111, variable-capacity compressor 112, condenser 113, and expansion device 110. Air valve 126 is located at one end of channel 109 and directs air to either freezer compartment 105 or fresh-food compartment 106. The air valve comprises an actuator 122 and a ball-like member 120. The actuator 122 is preferably a shape-memory actuator that contracts when heated at thus raises the ball-like member 120. The other end of the actuator is attached to a bracket 124 which is fixed to the housing of the refrigerator. When the actuator contracts it raises the ball-like member which closes the opening 128 between the channel 109 and the freezer compartment and unblocks the opening 130 between the channel and the fresh-food compartment. When no heat is applied to the actuator, it relaxes and returns the ball-like member to the position shown in FIG. 3. In this position the damper directs air to the freezer compartment and blocks flow to the fresh-food compartment. Controller 115 controls the operation of damper actuator 122, fan 101, and compressor 112. The controller receives input from temperature sensors 117 and 119 to determine the cooling needs for each compartment.

Figure 4:
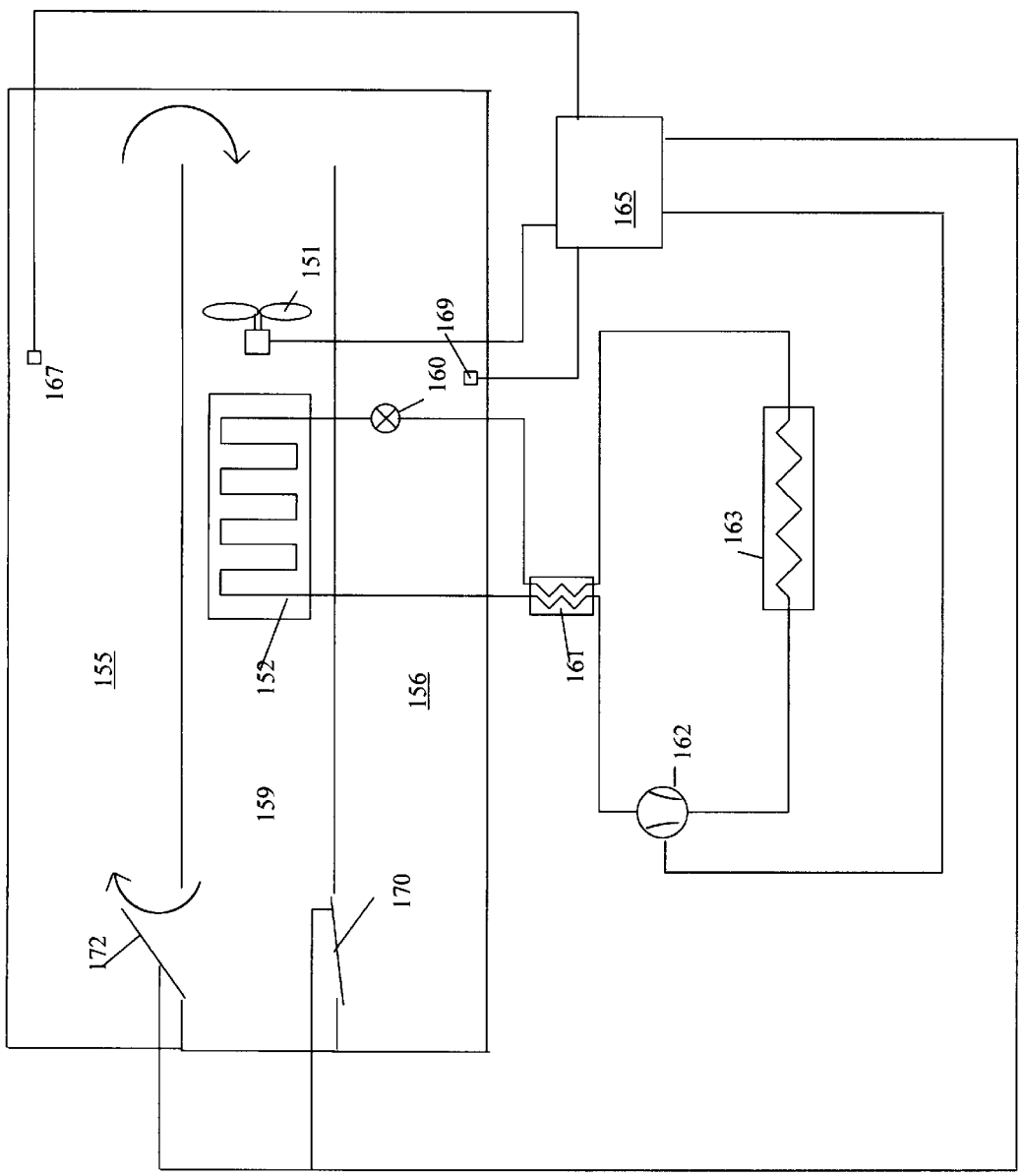
FIG. 4 shows an embodiment with two dampers to direct air flow from an evaporator fan.

FIG. 4 shows a similar embodiment that uses two dampers to direct air flow. As with the previous embodiments, evaporator 152 is part of a refrigerant circuit formed by suction-line heat exchanger 161, variable-capacity compressor 162, condenser 163, and expansion device 160. Fan 151 moves air through channel 159 over the evaporator. A controller 165 receives input from temperature sensors 169 and 167 and controls the operation of fan 151, compressor 162, a fresh-food air valve 170, and a freezer air valve 172. The air valves are simple dampers that are moved open by a heating a shape-memory alloy that causes the flap to twist. It may be necessary to heat the contact surfaces for the damper to ensure that no ice deposits that could interfere with movement of the damper.

When the freezer air valve 172 opens it allows cold air to enter freezer compartment 155 from channel 159. Likewise when the fresh-food valve 170 opens it allows cold air to enter the fresh-food compartment 156.

Figure 5:
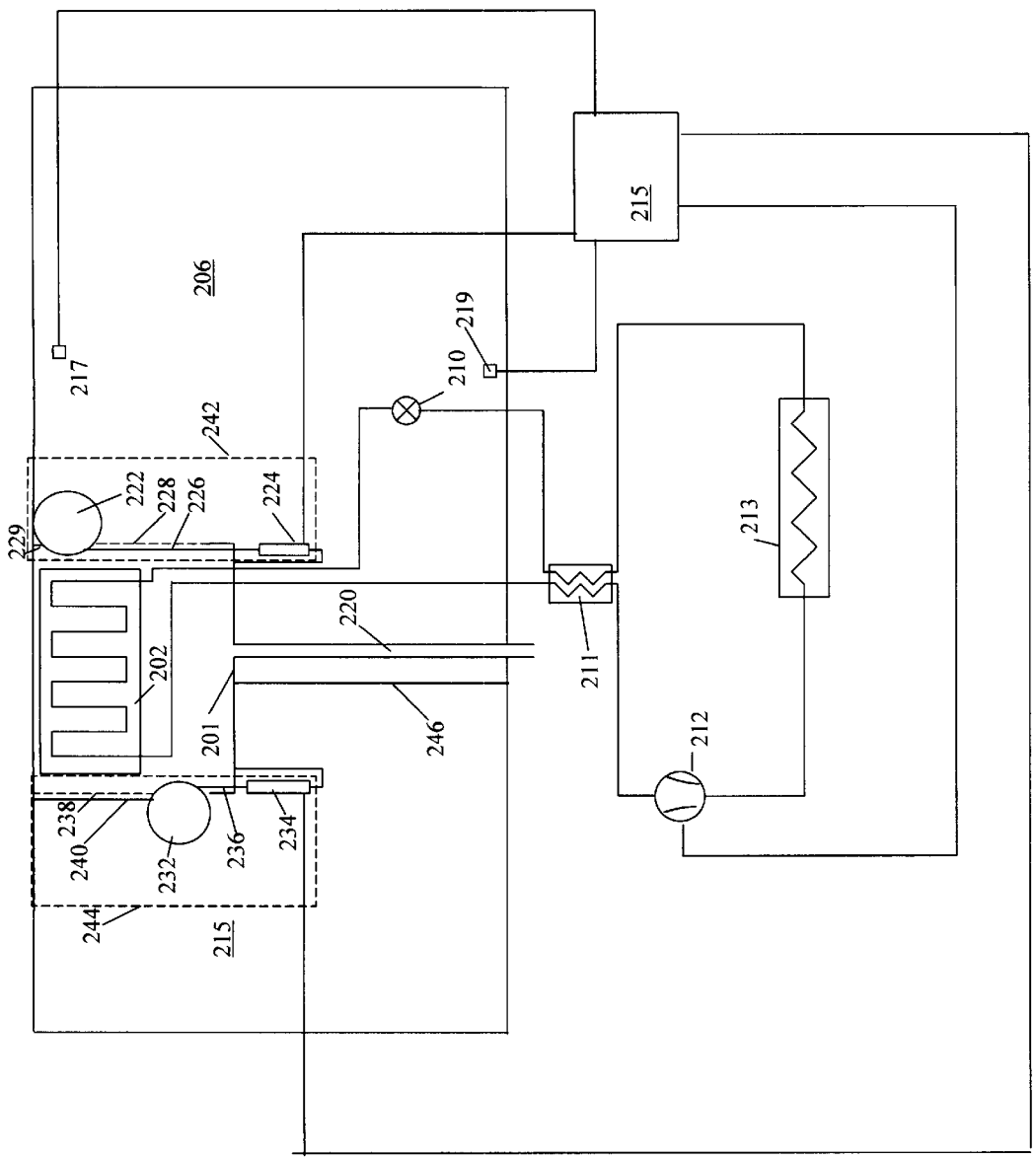
FIG. 5 shows an embodiment with a natural-convection evaporator.

FIG. 5 is an embodiment that uses a natural-convection evaporator to cool a fresh-food compartment 206 and a freezer compartment 215, which are separated by partition 246. This system uses two air valves, which comprise a fresh-food roller damper 242 and a freezer roller damper 244. The fresh-food roller damper 242 comprises a roller 222 that rolls over a porous surface 228. When the actuator is not activated the roller moves down by the force of gravity and covers the porous surface 228 with a flexible sheet 229 to block air flow. The damper opens when actuator 224 contracts and applies tension to line 226 which causes the roller to move upward and to roll up the sheet 229. A more complete description of this roller damper appears in co-pending U.S. patent application No. 09/262841.

The freezer roller damper 244, similarly comprises a roller 232 that is connected via a flexible line 236 to an actuator 234. The roller rolls over porous surface 238. As shown in FIG. 5 the roller damper is closed, which means that sheet 240 covers the porous surface 238 and blocks air flow. In both roller dampers the sheet is preferable of a flexible, magnetic material and the porous surface is made of a material such as steel that is magnetically attracted to the sheet. This attraction helps to create a tight seal. The sheet may include a layer of thermal insulation to help reduce undesirable heat transfer between the two compartments.

Unlike natural-convection systems in the prior art, this embodiment has an automatic defrost feature. With the fresh-food roller damper open and the freezer damper closed as shown in FIG. 5, the evaporator 202 is exposed to air from the fresh-food compartment 206. Simply allowing the compressor to remain off for period of time should allow any accumulation of ice to melt from the evaporator 202. Another less-desirable option is to use an electric heater to melt the ice, but this would introduce extra energy use plus the cost of a heater. The resulting water collects in drain pan 201 and drains through channel 220 to a location outside the refrigerator. As in prior art, heat from the condenser can be used to evaporate this water.

The preferred design of the evaporator is different from that for conventional natural-convection evaporator. The automatic defrost feature removes much of the concern for frost build up and manual removal. Designs similar to natural-convection condensers may be a good approach. Electrohydrodynamic (EHD) enhancement may be useful on the airside of the evaporator.

As in the other embodiments, the evaporator is part of a refrigerant circuit that comprises a suction line heat exchanger 211, a compressor 212, a condenser 213, and expansion device 210. A controller 215 receives input from temperature sensors 219 and 217. The controller 215 controls the operation of the roller dampers 242 and 244 and the compressor 212.

As in the other embodiments, the compressor is preferably a variable-capacity compressor, although the automatic defrost feature is possible with a fixed-capacity compressor. The preferred operation for this embodiment is summarized in the following table:

| Mode | Fresh-Food Damper | Freezer Damper | Compressor |
| --- | --- | --- | --- |
| fresh-food cooling | open | closed | low capacity |
| freezer cooling | closed | open | high capacity |
| defrost | open | closed | off |
| off | closed | closed | off |

Other arrangements of the dampers are possible with the refrigerator. For example instead of two independent dampers, it is possible to tie them together so the evaporator is always open to one compartment. This setup effectively creates a three-way air valve. This approach has the advantage that it could use a single actuator, but the disadvantage of a more complex damper arrangement and the possibility of greater leakage of air between compartments.

The preferred operation is similar for all these embodiments; the compressor operates at lower volumetric capacity in fresh-food cooling mode than in freezer cooling mode. This feature matches the capacity of the compressor to that of the expansion device, which improves efficiency.

This invention represents a major improvement over the prior art. Among the advantages of the present invention are:
1) Excellent energy efficiency: Energy savings of 20 to 30% are possible compared to conventional systems.
2) Reduced evaporator sizes: The evaporator for the fresh-food compartment can be much smaller than other two-temperature systems since the compressor capacity is controlled.
3) Ability to operate at steady-state in fresh-food cooling mode: The compressor capacity matches that of the capillary tube.
4) Improved pulldown operation: The variable compressor capacity allows for faster pulldown and combines with 3 to efficiently cool the fresh-food compartment.
5) Low first cost: The cost of the single-evaporator embodiment should cost close to that of a conventional system.
6) Improved humidity control: The segregation of air between the two compartments raises humidity in the fresh-food compartment.
7) Improved temperature control: The ability of the system to run in steady-state cooling for each compartment gives essentially independent control over compartment temperatures for a wide range of conditions.
8) No-frost with natural convection: The new system has the ability to provide efficient automatic defrost with natural-convection evaporators.

What is claimed is:

1. A refrigerator with a freezer compartment cooling mode and a fresh-food compartment cooling mode, comprising:
   a) a compressor for pumping refrigerant vapor;
   b) a condenser that receives compressed vapor from said compressor and cools it to produce refrigerant liquid;
   c) a first evaporator that evaporates said refrigerant liquid to produce refrigerant vapor and provides said refrigerant vapor to said compressor;
   d) a flow path between said condenser and said first evaporator that provides an approximately constant flow area during both the fresh-food and freezer cooling modes and that receives refrigerant liquid from said condenser and reduces the pressure of the refrigerant flowing into said first evaporator;
   e) means for controllably directing cooling produced by the evaporating refrigerant to said fresh-food compartment and said freezer compartment; and
   f) control means for reducing the volumetric capacity of said compressor during cooling of said fresh-food compartment relative to its volumetric capacity during cooling of said freezer compartment so as to match the refrigerant flow capacity of said flow path.

2. The refrigerator of claim 1 wherein said flow path comprises a capillary tube.

3. The refrigerator of claim 1 wherein said means for controllably directing cooling comprises a reversible fan for moving air over said evaporator in a first and second direction, a first air valve that opens to allow air flow through said freezer compartment in response to the fan blowing in a first direction and prevents flow through said freezer compartment in response to the fan blowing in the second direction, and a second air valve that opens to allow air flow through said fresh-food compartment when said fan blows in the second direction and prevents air flow through said fresh-food compartment when said fan blows in the first direction.

4. The refrigerator of claim 1 wherein said first evaporator located in an air path with said freezer compartment and said means for controllably directing cooling comprises a first fan for moving air over the first evaporator, a second evaporator that is located in a an air path with said fresh-food compartment and whose refrigerant pathway is connected in series with that of said first evaporator, and a second fan for moving air over said second evaporator so that when cooling is required for said fresh-food compartment the second fan is on and the first fan is off and when cooling is required for the freezer compartment the second fan is off and the first fan is on.

5. The refrigerator of claim 1 wherein said means for controllably directing cooling comprises a three-way air valve that selectively directs air from said evaporator to said fresh-food compartment and said freezer compartment.

6. The refrigerator of claim 5 further comprising a fan for moving air over said evaporator.

7. The refrigerator of claim 1 wherein said means for controllably directing cooling comprises a first two-way air valve that opens to allow air flow between said evaporator and said freezer compartment and a second two-way air valve that opens to allow air flow between said evaporator and said fresh-food compartment.

8. The refrigerator of claim 7 further comprising a fan for moving air over said evaporator.

9. The refrigerator of claim 1 wherein said compressor comprises a hermetic compressor with a variable-speed motor.

10. The refrigerator of claim 9 wherein said variable-speed motor is has two discrete operating speeds.

11. The refrigerator of claim 9 wherein said variable-speed motor is an induction motor and said control means comprises an inverter that provides variable-frequency AC power to said motor.

12. A method for controlling a refrigerator that includes a refrigerant circuit with a variable-capacity compressor that receives refrigerant vapor and pumps it into a condenser, which cools the refrigerant to form a liquid that flows through a flow path with an approximately constant flow area to an-evaporator and that includes means for controllably directing cooling to a fresh-food compartment and a freezer compartment, said method comprising the steps of:

operating the compressor at a higher volumetric capacity and at the same time directing cooling toward said freezer compartment during freezer cooling, and operating the compressor at a lower volumetric capacity and at the same time directing cooling toward said fresh-food compartment during fresh-food cooling.

13. A refrigerator with a freezer compartment and a fresh-food compartment comprising:

a compressor for pumping refrigerant vapor, a condenser that receives compressed vapor from said compressor and cools it to produce refrigerant liquid, a flow path from said condenser that provides an approximately constant flow area during both the fresh-food and freezer cooling modes and that receives refrigerant liquid from said condenser and reduces the pressure of the liquid, an evaporator that receives lower-pressure liquid from said flow path and evaporates said liquid to produce cooling and provides said refrigerant vapor to said compressor, and an air valve directing air flow between said evaporator and said fresh-food compartment and said freezer compartment, control means for reducing the volumetric capacity of said compressor during cooling of said fresh-food compartment relative to its volumetric capacity during cooling of said freezer compartment so as to match the refrigerant flow capacity of said flow path.

14. The refrigerator of claim 13 wherein said heat transfer between said evaporator and air is primarily by natural convection.

15. The refrigerator of claim 13 further comprising a second air valve for directing air flow between said fresh-food compartment and said freezer compartment.

* * * * *